United States Patent
He et al.

(10) Patent No.: US 10,437,391 B2
(45) Date of Patent: Oct. 8, 2019

(54) OPTICAL TOUCH SENSING FOR DISPLAYS AND OTHER APPLICATIONS

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 28 days.

(21) Appl. No.: 15/807,561

(22) Filed: Nov. 8, 2017

(65) Prior Publication Data

US 2018/0136788 A1    May 17, 2018

Related U.S. Application Data

(60) Provisional application No. 62/423,733, filed on Nov. 17, 2016, provisional application No. 62/510,230, filed on May 23, 2017.

(51) Int. Cl.
*G06F 3/042* (2006.01)
*G06F 3/0354* (2013.01)

(52) U.S. Cl.
CPC ........ *G06F 3/0428* (2013.01); *G06F 3/03545* (2013.01); *G06F 2203/04101* (2013.01)

(58) Field of Classification Search
CPC .... G06F 3/0346; G06F 3/03542; G06F 3/042; G06F 3/03545; G06F 2203/04101

(Continued)

(56) References Cited

U.S. PATENT DOCUMENTS

| 2010/0328267 A1 | 12/2010 | Chen | |
|---|---|---|---|
| 2014/0160494 A1* | 6/2014 | Kuba | G01B 11/002 356/614 |

(Continued)

FOREIGN PATENT DOCUMENTS

| CN | 101937289 A | 1/2011 |
|---|---|---|
| CN | 102375616 A | 3/2012 |

(Continued)

OTHER PUBLICATIONS

International Search Report from PCT/CN2018/084429 dated Jul. 20, 2018 (5 pages).

*Primary Examiner* — Michael Pervan
(74) *Attorney, Agent, or Firm* — Perkins Coie LLP

(57) ABSTRACT

Touch sensing based on optical sensing as disclosed herein can be implemented by using an optical stylus or pointer that emits probe light for optical sensing, and spatially distributed optical sensors at different spatial locations for sensing. The measurements from the different optical sensors can be processed to determine the position of the light from the optical stylus at the screen. Optical sensing of a position on a two-dimensional surface and a position in a three-dimensional space can be achieved for various optical touch sensing applications. In one implementation, an apparatus can include a screen or display, an optical stylus or optical pointer, and two or more optical angle sensors which determine, respectively, a first angle between the first optical angle sensor and a position of light at the screen and a second angle between the second optical angle sensor and the position of light at the screen.

18 Claims, 16 Drawing Sheets

(58) Field of Classification Search
USPC ............ 178/18.09, 19.05; 345/175, 179, 181
See application file for complete search history.

(56) References Cited

U.S. PATENT DOCUMENTS

| | | |
|---|---|---|
| 2015/0035799 A1 | 2/2015 | Lin et al. |
| 2015/0054791 A1* | 2/2015 | Omura ................. G06F 3/0418 345/175 |
| 2015/0136946 A1 | 5/2015 | Kuo et al. |
| 2018/0039344 A1* | 2/2018 | Yamamoto .............. G06F 3/042 |

FOREIGN PATENT DOCUMENTS

| | | |
|---|---|---|
| CN | 103399671 A | 11/2013 |
| CN | 104345990 A | 2/2015 |
| CN | 104657000 A | 5/2015 |
| JP | 2015056064 A | 3/2015 |

* cited by examiner

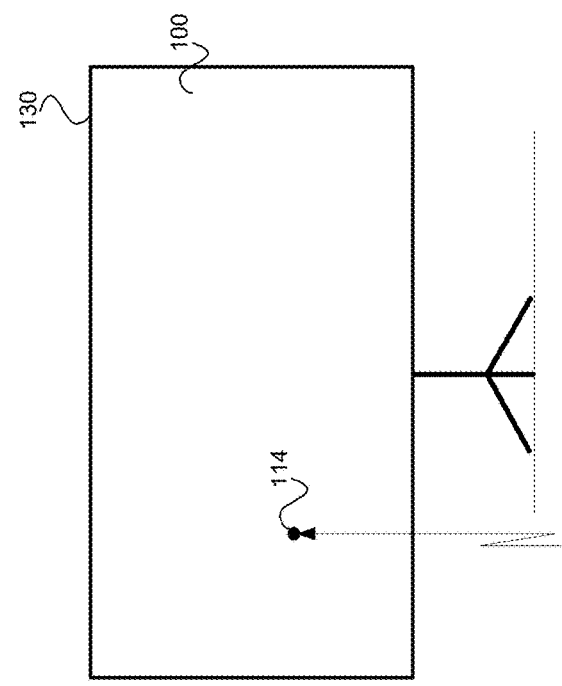
FIG. 1A
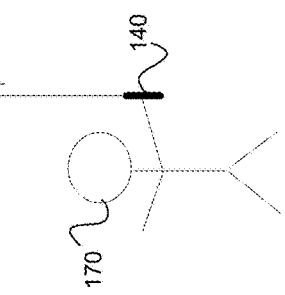
FIG. 1B
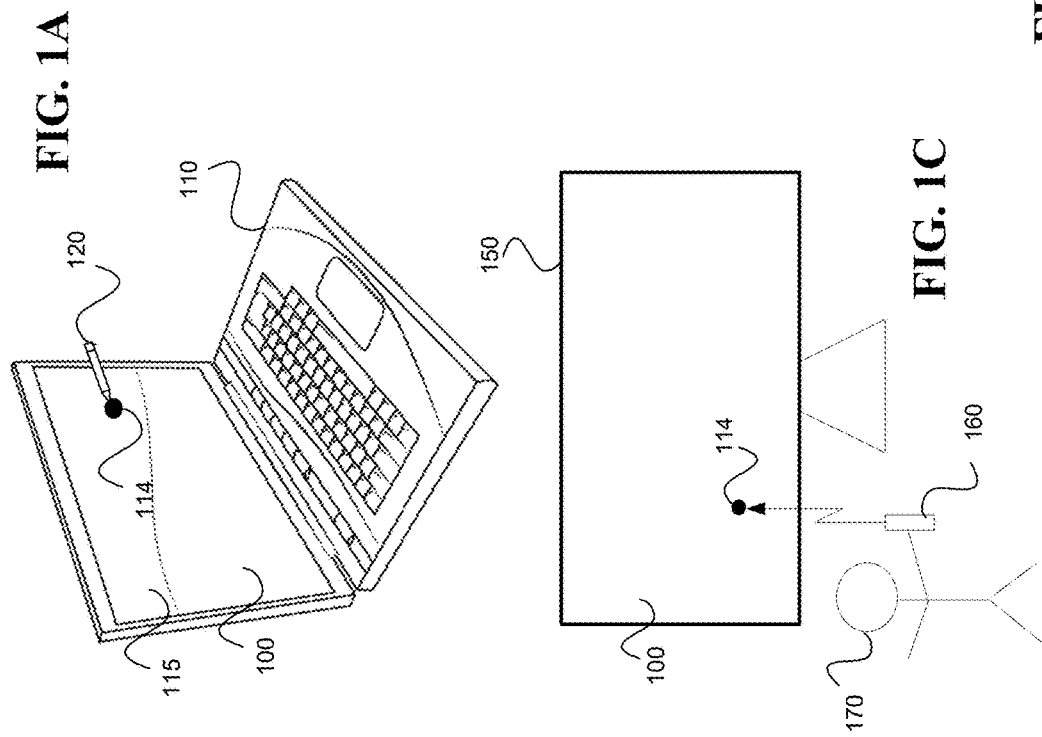
FIG. 1C
FIG. 1

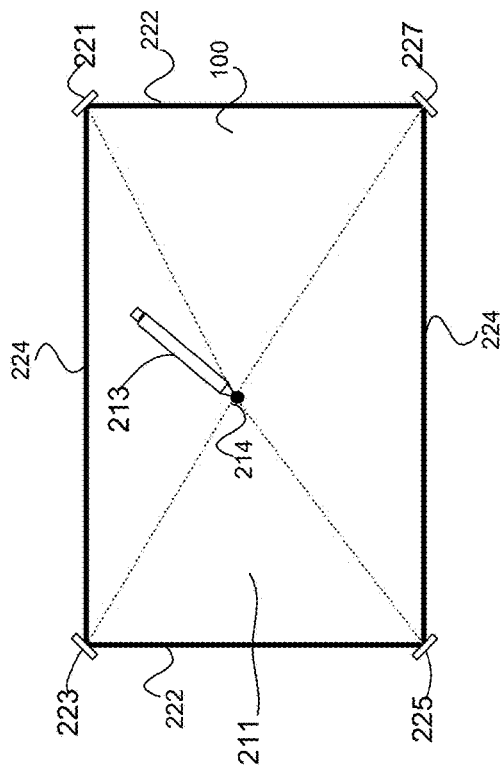
FIG. 2A
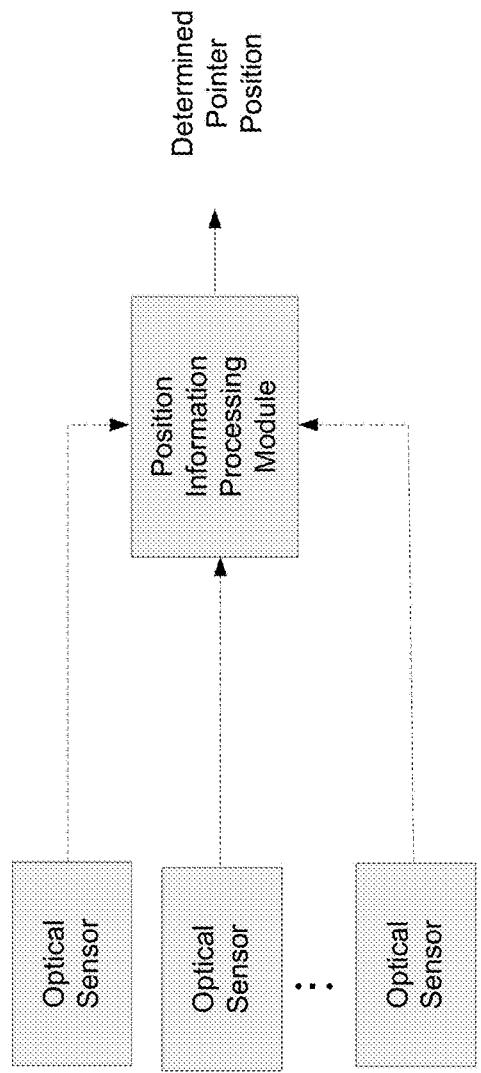
FIG. 2B
FIG. 2

500

510 — Receiving, at a first angle sensor, a light for determining a first angle between the first angle sensor and a position of the light at a screen, wherein the light is emitted from an optical stylus 520 — Receiving, at a second angle sensor, the light for determining a second angle between the second angle sensor and the position of the light at the screen 530 — Determining the position of the light from the first angle and the second angle

FIG. 5

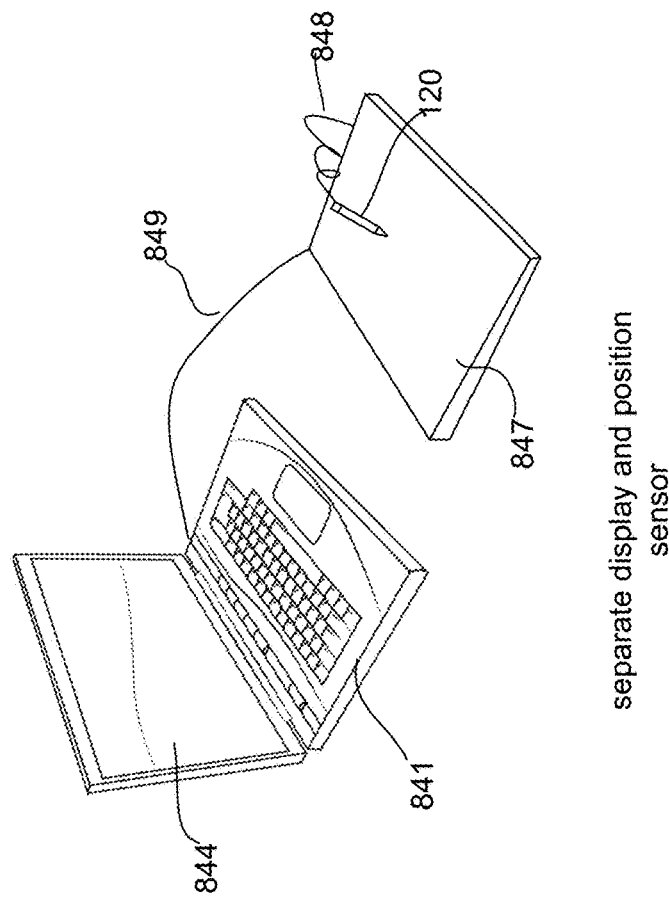
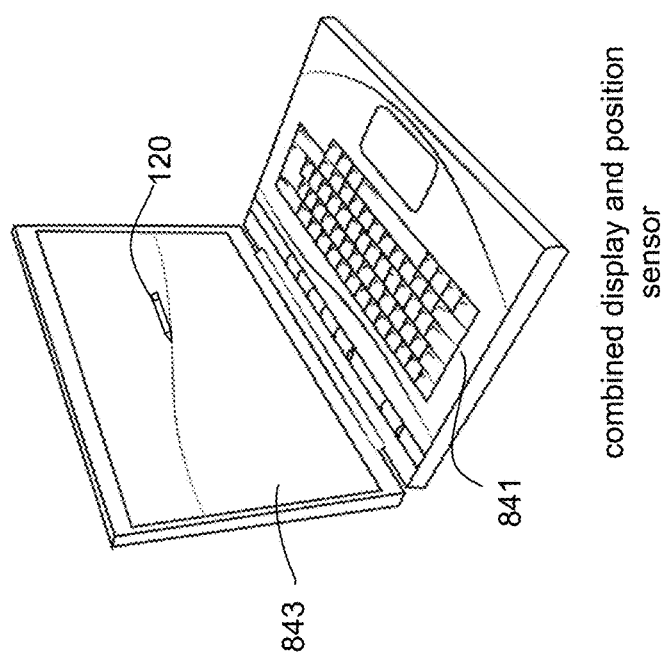
FIG. 8B

913- Touch pen with coded light source
917- Display cover layer
918- Adhesive under the display cover layer
919- Display body materials
921, 923- 3D angle detectors
931- Light rays above the display cover layer
937- Light rays transmitted into the display

OPTICAL TOUCH SENSING FOR DISPLAYS AND OTHER APPLICATIONS

CROSS REFERENCE TO RELATED APPLICATIONS

This patent document claims the benefit of priority of U.S. Provisional Patent Application No. 62/423,733, filed on Nov. 17, 2016, and U.S. Provisional Patent Application No. 62/510,230, filed on May 23, 2017. The entire contents of the before-mentioned patent applications are incorporated by reference as part of the disclosure of this application.

TECHNICAL FIELD

The disclosure of this patent document relates to optically sensing the position of an object in various applications.

BACKGROUND

Sensing an object has different applications. For example, touch sensing by sensing a touch of a finger or another object on a surface can be used for touch screens. Touch screens are used by applications in various devices and systems. For example, various computers including smartphones, laptop computers, and netbook computers use touch screens. Touch sensing in touch screens and other applications may be implemented as capacitance sensitive devices overlaid onto a display such as a liquid crystal display (LCD), organic light-emitting diode (OLED) display, or other display. Touchscreens provide position information regarding where a user has touched the screen. The position information can be used as user input such as selecting a function or action for a computer to perform.

SUMMARY

The disclosed technology in this patent document provides touch sensing based on optical sensing and can be used to determine a position of a light beam in a device, for example, a display or display region, to provide a position-based sensing for desired operations, such as touch-based user interface operations in portable devices (e.g., smartphones, tablets, laptop computers), computers and other devices, and other touch-based user interactions. As a specific example, the disclosed touch sensing based on optical sensing can be used for determining a position of a light-emitting stylus or pointer on a display for touch sensing and various applications. The disclosed technology can be used to provide a touch sensing function based on optical sensing in displays including large format displays where touch sensing on a large format display based on capacitive touch sensing that can be technically difficult and/or expensive to implement.

In one aspect, an apparatus with a touch sensing based on optical sensing is provided that includes a screen, an optical stylus that emits light, a first optical angle sensor positioned on the screen to measure the light from the optical stylus at a first angle from a position of light from the optical stylus to the first angle sensor on the screen, a second optical angle sensor positioned on the screen at a different position from the first angle sensor to measure the light from the optical stylus at a second angle from the position of light from the optical stylus to the second angle sensor on the screen, and circuitry coupled to receive measured first and second angles from the first and second optical angle sensors and process the measured first and second angles to determine the position of the light from the optical stylus at the screen.

One or more of the following features can be included in any feasible combination. The apparatus can include a third angle sensor for determining a third angle between the third angle sensor and the position of light at the screen, wherein the circuitry further determines the position of the light from the third angle and the first angle, or from the third angle and the second angle. The apparatus can further include a fourth angle sensor for determining a fourth angle between the fourth angle sensor and the position of light at the screen, wherein the circuitry further determines the position of the light from the fourth angle and the third angle, or from the fourth angle and the second angle, or from the fourth angle and the second angle. The optical stylus can generate light from a tip of the stylus in a hemispherical pattern. The optical stylus can generate light from a tip of the stylus in a directional pattern, wherein the directional pattern causes the generated light to be sent to at least the first angle sensor and the second angle sensor. In some example embodiments, the light from a tip of the stylus can be a point light source that emits light to all directions. The optical stylus can be a laser pointer. The screen can be a display of a laptop computer, smartphone, netbook, ultra-book, or desktop computer including displays with surface areas between 4 square inches to 500 square inches. The screen can be a display of a television or computer display between 500 square inches and 3000 square inches. The screen can be a display for a meeting room, auditorium, or classroom, wherein the display is larger than 3000 square inches. The screen can be paper, cloth, or plastic. The screen or display can include a waveguide material.

In another aspect, the disclosed technology can be used to provide an apparatus capable of touch sensing based on optical sensing. This apparatus can include a display panel on which images are displayed; 3-dimensional optical angle sensors located at different positions relative to the display panel to detect incident angles of different light beams from a light-emitting optical pointer for optical touch sensing; and a processor in communication with the 3-dimensional optical angle sensors to process information from the detected incident angles of the different light beams at the different 3-dimensional optical angle sensors to determine a distance of the light-emitting optical point with respect to the display panel and a 3-dimensional position of the light-emitting optical pointer relative to the display panel.

In yet another aspect, a method is provided for optical touch sensing in a 3-dimensional space and includes using different 3-dimensional optical angle sensors located at different peripheral positions around a display panel to detect incident angles of different light beams from a light-emitting optical pointer for optical touch sensing; using the different 3-dimensional optical angle sensors to measure a distance of the light-emitting optical point with respect to the display panel; combining the detected incident angles of different light beams from the light-emitting optical pointer and the measured distance of the light-emitting optical pointer with respect to the display panel to determine a 3-dimensional position of the light-emitting optical pointer relative to the display panel; and performing a touch sensing operation via the display panel based on the 3-dimensional position of the light-emitting optical pointer relative to the display panel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 1 depicts examples of optical sensing based touch sensing and position sensing using an optical position sensor in display applications in FIGS. 1A, 1B and 1C.

FIG. 2 includes FIGS. 2A-2B which depict a screen and optical position sensor including four optical angle sensors, in accordance with some example embodiments.

FIG. 5 depicts a process, in accordance with some example embodiments.

FIG. 8B depicts a portable computer with a display that includes optical position sensors and a display with separate optical position sensors, in accordance with some example embodiments.

Where possible, like reference numbers refer to the same or similar features in the drawings.

DETAILED DESCRIPTION

Figure 3:
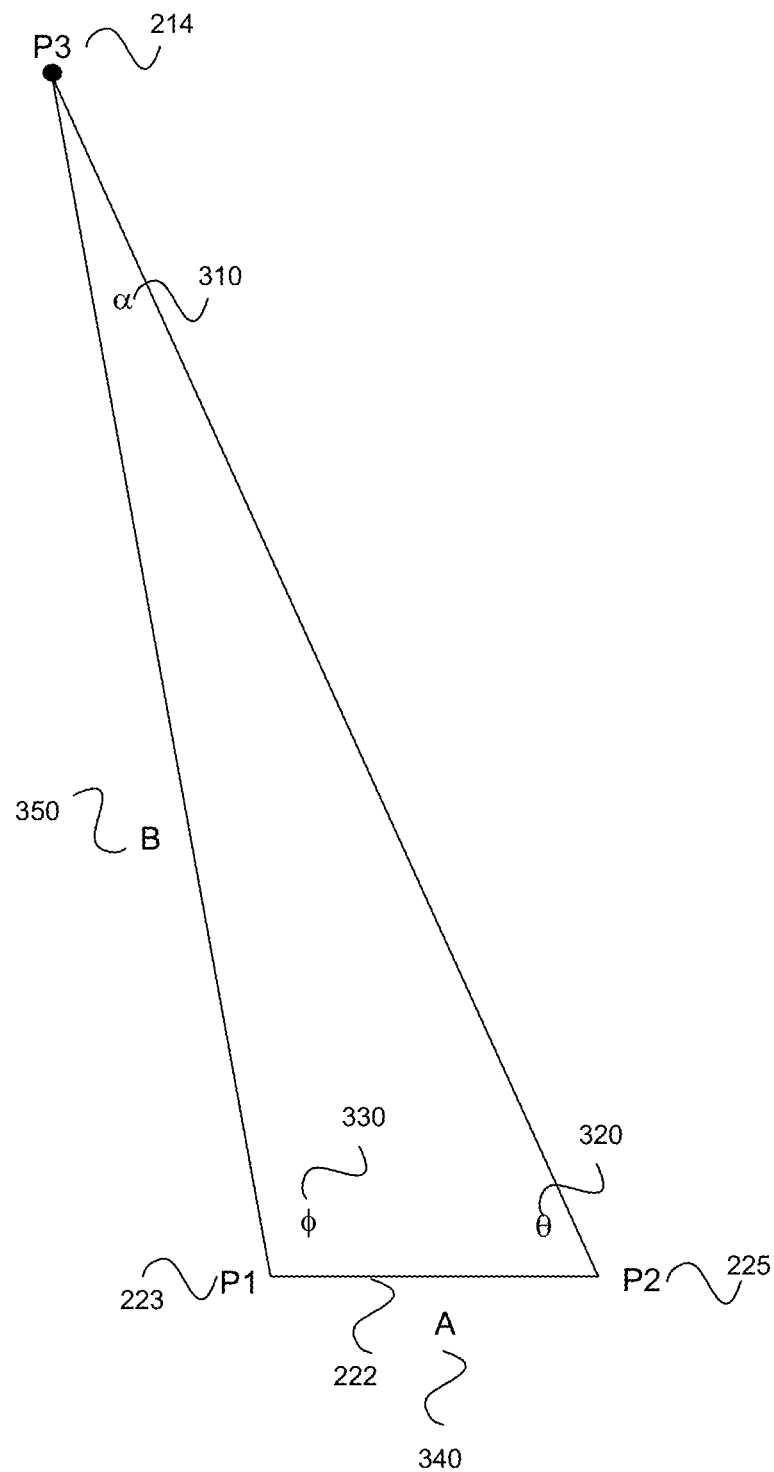
FIG. 3 depicts determining a position on a screen, in accordance with some example embodiments.

Touch sensing based on optical sensing as disclosed herein can be implemented by using an optical stylus or pointer that emits probe light for optical sensing, and spatially distributed optical sensors at different spatial locations for sensing. The measurements from the different optical sensors can be processed to determine the position of the light from the optical stylus at the screen. Both optical sensing of a position on a two-dimensional surface and a position in a three-dimensional space can be achieved for various optical touch sensing applications.

A touchscreen display can include a capacitive touchscreen coupled together with a display such as a liquid crystal display or OLED display. For example, a laptop touchscreen display, a tablet touchscreen display, or a mobile phone touchscreen display can include a display coupled to a touchscreen. The touchscreen may provide touch position information to a processor or other circuitry. Touchscreen displays may respond to an actual touch by a finger or other device to cause a change in capacitance that can be sensed by the touchscreen. In some applications, a screen position sensor can be used to determine a position without direct contact as in a touch from a finger or other device. Implementation examples disclosed herein use optical angle sensors that can be mounted to a display or other object to determine the position of an optical stylus, and/or the position that an optical pointer is aimed, and/or the position of a finger within the display or object. Each such a position may be referred to as a "pointer position" and, depending on the touch sensing display is configured, the position information may be used for an operation based on the position. Each optical angle sensor may determine an angle from the optical angle sensor to the pointer position on a screen. The pointer position provides position information to a computer or other circuitry similar to the position information provided when a surface, a display region or a touchscreen, is touched by a light-emitting pointer or stylus or is pointed by a light beam.

For example, a screen position sensor may include optical angle sensors (e.g., four sensors), one mounted to each corner of a rectangular or square display. From the angles determined by the optical angle sensors, the pointer position of the stylus within the frame can be determined.

In another example, optical angle sensors may be mounted to the corners of a large rectangular frame attached to a painted wall. From the angles determined by the optical angle sensors, the pointer position to which an optical pointer such as a laser pointer is pointed within the frame can be determined.

In another example, two optical angle sensors may be mounted to opposite edges on a rectangular screen. Each optical angle sensor may determine an angle from the optical angle sensor to the pointer position. The pointer position may be determined from the two angles determined from the two optical angle sensors.

The screen may be implemented by a suitable display screen, such as various electronic displays or a suitable type of surface such as a wall, paper, cloth, plastic or a suitable material. As used herein, a screen refers to the area around the optical position sensor in which the optical position sensor can determine an angle to the aimed position.

FIG. 1 depicts various embodiments of an optical position sensor and optical sources 120, 140, and 160 shown in FIGS. 1A, 1B and 1C, respectively. For example, a portable computer 110 can include an optical position sensor 100 to determine the on-screen position 114 of emitted light from a stylus 120 that is either on or in contact with, or near the portable computer display 115 (FIG. 1A). In another example in FIG. 1B, large area screen 130 may include an optical position sensor 100 to determine the position that optical pointer 140 is pointed to an on-screen location 114 by user 170 to screen 130 by sensing the light emitted by the optical pointer 140. In yet another example in FIG. 1C, screen 150 such as a television or another large format display may include an optical position sensor 100 to determine the on-screen position 114 that a light-emitting pointer 160 is pointed by user 170 to the position 114 on the screen 150.

Portable computer 110 in the example in FIG. 1A may include a laptop computer, notebook computer, netbook computer, tablet computer, ultra-book computer, desktop computer, or other suitable computer devices or systems. Portable computer 110 may include display 115 which can be a liquid crystal display (LCD), an organic light emitting diode (OLED) display, an LED display, or a display based on another suitable display technology. Optical position sensor 100 can determine the position 114 of emitted light of a stylus 120 on or near the portable computer display 115. For example, stylus 120 can emit light that is detected by optical position sensor 100. The position of stylus 120 can be determined by the optical position sensor from the position 114 of the light emitted from stylus 120. In some example embodiments, optical position sensor 100 can include two or more optical angle sensors for determining the pointed position 114 of stylus 120 on the display 115.

In the example in FIG. 1B, the large area screen 130 may be a screen used in an auditorium, meeting room, classroom, convention center, sports center, or airport, transit center, or another location. Large area screen 130 may be a display such as an LCD display, an organic light-emitting diode (OLED) display, an LED display, a projector-type display, or another suitable display type. In some example embodiments, large area screen 130 may be a surface that an image is projected onto. For example, large area screen 130 may be a projection screen such as a projection screen for a slide show, a computer information, sports information or other information. The large area screen may be made of flexible material such as cloth or other flexible material, or may be a surface such as an interior or exterior wall, or other rigid or flexible surface. Large area screen 130 may include an optical position sensor 100 to determine the position 114 that optical pointer 140 is pointed by user 170 to screen 130. Optical position sensor 100 can determine the aimed position 114 of optical pointer 140 toward large area screen 130. For example, optical pointer 140 can emit light that is detected by optical position sensor 100. The position 114 of optical pointer 140 can be determined by the optical position sensor 100 from the light emitted from optical pointer 140. In some example embodiments, optical position sensor 100 can include two or more optical angle sensors for determining the position 114 of optical pointer 140.

Screen 150 in the example in FIG. 1C may be a screen based on various display technologies, such as a television screen or other display screens including intermediate sized screens. Screen 150 can include an electronic display such as an LCD display, light-emitting diode (LED) display, an OLED display, or other suitable type of display. For example, screen 150 may be an LCD flat screen television in a home for entertainment system, or a flat screen display in a business or public area to provide information or advertisements. Screen 150 may be an electronic display or surface for projection as described above with respect to the large screen 130. Screen 150 may include an optical position sensor 100 to determine the position 114 that optical pointer 160 is pointed by user 170 to screen 150. For example, optical pointer 160 can emit light that is detected by optical position sensor 100. Optical pointer 160 may include a laser pointer, LED pointer, or other optical pointer. Pointer 160 may be included in a remote control such as a television remote or game controller. The position 114 of optical pointer 160 can be determined by the optical position sensor 100 from the light emitted from optical pointer 160. In some example embodiments, optical position sensor 100 can include two or more optical angle sensors for determining the position of optical pointer 160. All the forgoing screens can be of flat or curved surfaces.

FIG. 2 includes FIGS. 2A-2B to illustrate a specific example of a screen 211 implemented with four optical angle sensors 221, 223, 225 and 227 for optically sensing the pointed position 214 of the optical stylus 213. FIG. 2A shows an example of the optical sensing arrangement on the screen 211 having the four optical angle sensors 221, 223, 225 and 227 respectively located at the four different corners of the screen 211. FIG. 2B shows an example of a signal processing system where processing circuitry or a position information processing module is provided to process the output signals (either angle measurements or power measurements) from the optical sensors to determine the pointer position. The description of FIGS. 2A and 2B include features from FIG. 1.

Specifically, FIG. 2A depicts a screen 211, a stylus 213, and an optical position sensor 100 including four angle sensors 221, 223, 225, and 227. Screen 211 may be implemented by a display technology of the screens/displays described above including a portable computer display, a large area screen 130, and/or an intermediate area screen 150. Screen 211 may be rectangular with sides of lengths shown at 222 and 224. Pointer 213 can include a suitable optical pointer such as the examples of the foregoing optical pointers 120, 140, 160 described above. Optical angle sensors 221, 223, 225, 227, determine an angle between each optical sensor and pointer position 214. For example, optical angle sensor 221 can determine an angle between optical sensor 221 (either parallel to the detecting surface of 221 or normal to the detecting surface of 221) and pointer position 214. Optical angle sensor 223 can determine an angle between optical sensor 223 (either parallel to the detecting surface of 223 or normal to the detecting surface of 223) and pointer position 214. Optical angle sensor 225 can determine an angle between optical sensor 225 (either parallel to the detecting surface of 225 or normal to the detecting surface of 225) and pointer position 214. Optical angle sensor 227 can determine an angle between optical sensor 227 (either parallel to the detecting surface of 227 or normal to the detecting surface of 227) and pointer position 214. Four angles can be determined from the four optical angle sensors. The pointer position 214 can be determined from any two of the four angles. In this way, four estimates of pointer position 214 may be determined from the four angles. In some example embodiments, the accuracy of pointer position 214 may be improved by averaging one or more of the pointer position estimates.

In some example embodiments, multiple optical power sensors can be placed at know positions around the periphery of screen 211, e.g., sensors 221, 223, 225, and 227 as shown, and can be configured as power sensors without determining an angle to pointer position 214. The pointer position 214 can be determined from the optical power emitted from the pointer positon 214 that is detected by the different optical power sensors 221, 223, 225, and 227. For example, the differences in the power levels detected at the different optical power sensors 221, 223, 225, and 227 may be used to determine the pointer position 214, or a ratio of the power levels detected at the different optical power sensors 221, 223, 225, and 227 may be used to determine the pointer position 214. In some implementations, one optical power sensor can be designed to determine a total power received from multiple directions. In some example embodiments, stylus 213 may emit light radially at pointer position 214 with uniform or predetermined power density in each direction. The emitted light may be modulated according to a PN code or other code. In some example embodiments, the detected power from any three sensors can determine the pointer position 214. In some example embodiments, optical power sensors 221, 223, 225, and 227 may be combined with optical angle sensors so that both the angle measurements and the optical power levels may be processed to determine the position of the pointer 214. Combined angle information and power information may be used advantageously to achieve a higher accuracy in the pointer position 214.

FIG. 3 depicts an example of determining a pointer position 214 on a screen from two angles generated by two optical angle sensors such as 223 and 225 in the example in FIG. 2. The description of FIG. 3 includes features from FIGS. 1 and 2. In the example of FIG. 3, optical angle sensor 223 can determine angle φ at 330 and optical angle sensor 223 can determine angle θ at 320. The distance between optical angle sensor 223 and 225 is the length of edge 222, or length A at 340. With the forgoing quantities, the distance from optical angle sensor 223 to pointer position 214, or length B at 350, may be determined from:

$$B = A\frac{\sin\theta}{\sin\alpha} = A\frac{\sin\theta}{\sin(\theta + \phi)}, \qquad \text{Eq. (1)}$$

From A, φ, θ, and B, pointer position 214 can be determined. Although the forgoing example included optical angle sensors 223 and 225 from FIG. 2, any pair of optical angle sensors 221, 223, 225, and 227 may be used in this way to determine the position of pointer position 214.

Figure 4:
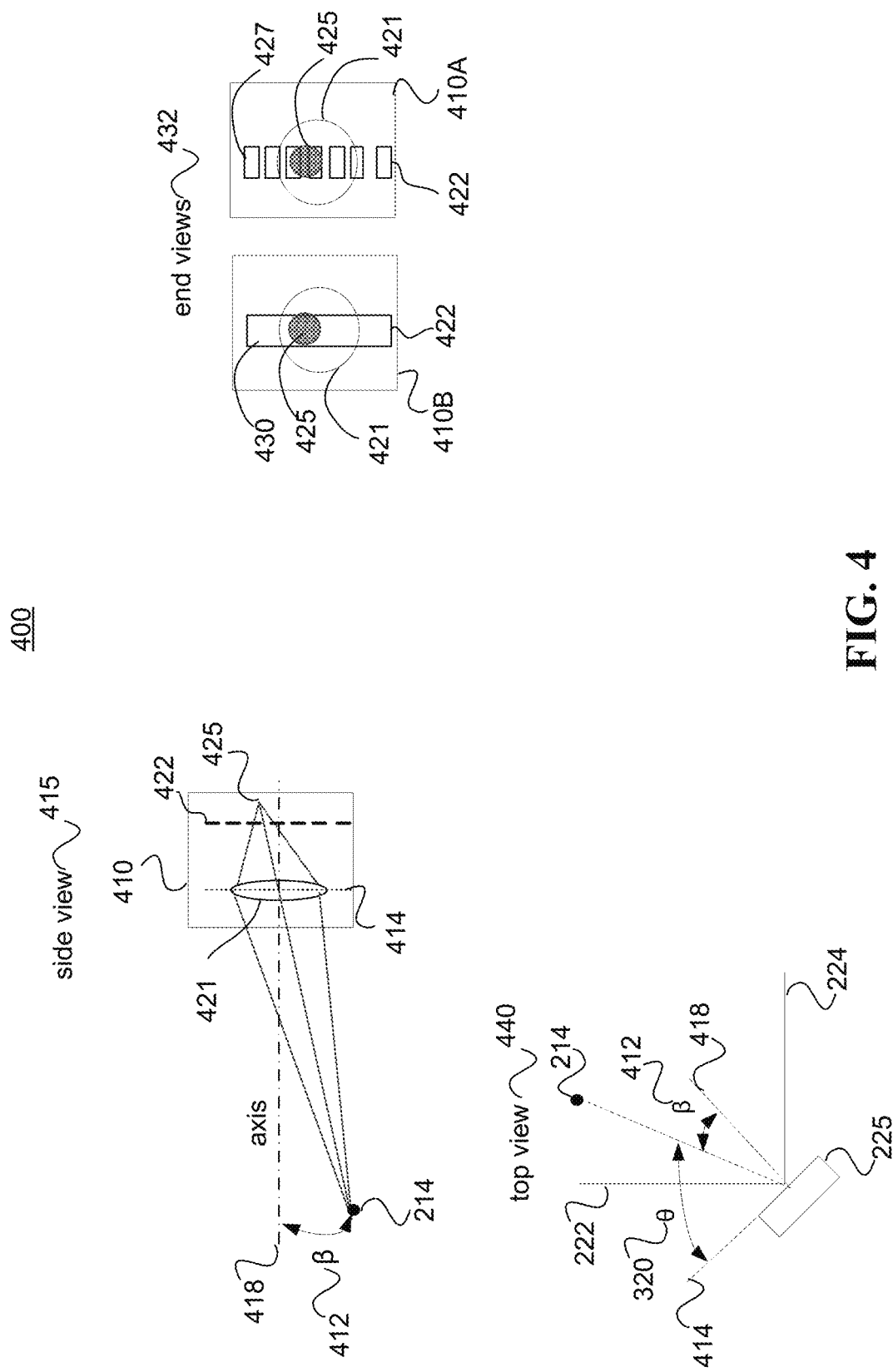
FIG. 4 depicts an optical angle sensor, in accordance with some example embodiments.

FIG. 4 at 400 depicts an example of a side view 415, a top view 440, and two end views 432 of an optical angle sensor 410 such as optical angle sensor 221, 223, 225, or 227. The description of FIG. 4 includes features from FIGS. 1-3. Optical angle sensor 410 includes at least a lens 421 and an optical sensor 422 which can be, in various implementations, an optical position sensitive detector (PSD) that includes multiple optical detector elements at different locations, e.g., in an array. From the light emitted from stylus 120, or pointer 140 or 160, a spot of light 425 is produced by lens 421 at detector 422. The position of the spot of light 425 on detector 422 is determined by the angle 412 between the axis 418 of optical angle sensor 410 and the direction to pointer/stylus at position 214. Optical angle sensor 410 determines the angle such as angle 320 and/or 330 in FIG. 3 from the position of spot 425 on detector 422. Angle 412 and angle 320 and/or 330 may be related by a geometric relationship such as the relationship between the axis 418 of optical angle sensor 410 and an axis 414 normal to axis 418. For example, angles 412 and 320/330 may be related according to θ+β=90 degrees. The angles shown in FIGS. 2 and 4 may be related by other geometric relationships as well.

Optical angle sensor 410 including lens 421 and detector 422 can be configured to sense light in a predetermined detection angle. For example, optical angle sensor 225 in FIG. 4 can sense light within the edges 222 and 224 of the display/screen 115, 130, 150. The edges 222 and 224 may define a detection angle of 90 degrees as shown in FIG. 4, or other angles such as 180 degrees. In some example embodiments, all the angle sensors associated with a display, such as optical angle sensors 221, 223, 225, and 227, when combined can provide light sensing at a location on a display such as display/screen 115, 130, 150. Lens 421 may include one or more optical components such as an optical lens, pinhole, and/or other optical component.

Optical angle sensor 410 may include a series of photodetectors 427 shown at 410A, or a position sensitive photodetector (PSD) 430 shown at 410B that measures a position of a beam spot along one or two directions on the optical sensing surface of the PSD 430, or a combination of both. For example, optical angle sensor 410 may include an array of photodetectors 427 at different locations. Each photodetector 427 may be a photo sensing element which can be implemented by a photodiode, photoresistor, phototransistor, or other optically active electronic component. In the example of FIG. 4 seven photodetectors are shown at 410A but different numbers of photodetectors may be used as well. In some example embodiments, the position of spot 425 may be determined from which photodetectors 427 are responding to spot 425. For example, when photodetectors 427 are photodiodes, electrical signals such as currents or voltages may be generated at the detectors in which light spot 425 is received and detected. When light spot 425 illuminates one photodetector only the illuminated photodetector responds to the light spot 425. When the spot illuminates more than one detector 427, the position of the spot may be determined by comparing the responses of multiple photodetectors. For example, when the spot illuminates two photodetectors, a difference current based on a difference between the detector outputs from the two photodetectors may be used to determine the position of the spot, or a ratio of the two currents from the two photodetectors may be used to determine the position of the spot.

In another example, optical angle sensor 410 may include position sensitive detector (PSD) 430. Position sensitive detector 430 may produce one or more currents from which the position of spot 425 may be determined. For example, PSD 430 may be a photodiode that produces two currents in response to illumination by spot 425. One current may include a current inversely proportional to the distance from a first electrode, and the other current may produce a current inversely proportional to the distance between the spot and the second electrode. Both currents may also include an offset current or an error current. In some example embodiments, the position, x, may be proportional to the following expression:

$$x \propto \frac{I_2 - I_1}{I_2 + I_1}, \qquad \text{Eq. (2)}$$

where the position, x, may be relative to the center of the PSD, I1 is a current relative to one electrode, and I2 is the current relative to the other electrode. In some example embodiments, more than one PSD may be included at 430 such as two PSDs placed end to end.

Although detector 422 is configured in FIG. 4 as a one-dimensional array/PSD, a two-dimensional array/PSD may also be used to determine two angles such as angle 412 and another angle in an orthogonal axis.

FIG. 5 depicts a process, in accordance with some example embodiments. The description of FIG. 5 includes features from FIGS. 1-4. At 510, a light is received at a first angle sensor for determining a first angle between the first angle sensor and a position of the light at a screen. At 520, the light is received at a second angle sensor for determining a second angle between the second angle sensor and the position of the light at the screen. At 530, the position of the light is determined from the first angle and the second angle.

At 510, a light can be received at a first angle sensor such as optical angle sensor 221. For example, light from a stylus such as stylus 120 or light from a pointer such as pointer 140 or 160 may be emitted to produce a spot of light at pointer position 214. Optical angle sensor 221 may determine a first angle between the optical angle sensor 221 and a pointer position 214 of the light at a screen or display such as screen/display 115, 130 and/or 150.

At 520, a light can be received at a second angle sensor such as optical angle sensor 223. For example, light from a stylus such as stylus 120 or light from a pointer such as pointer 140 or 160 may be emitted to produce a spot of light at pointer position 214. Optical angle sensor 223 may determine a second angle between the optical angle sensor 223 and a pointer position 214 of the light at a screen or display such as screen/display 115, 130 and/or 150.

At 530, the pointer position 214 can be determined from the first angle and the second angle as described in FIGS. 3 and 4.

Figure 6:
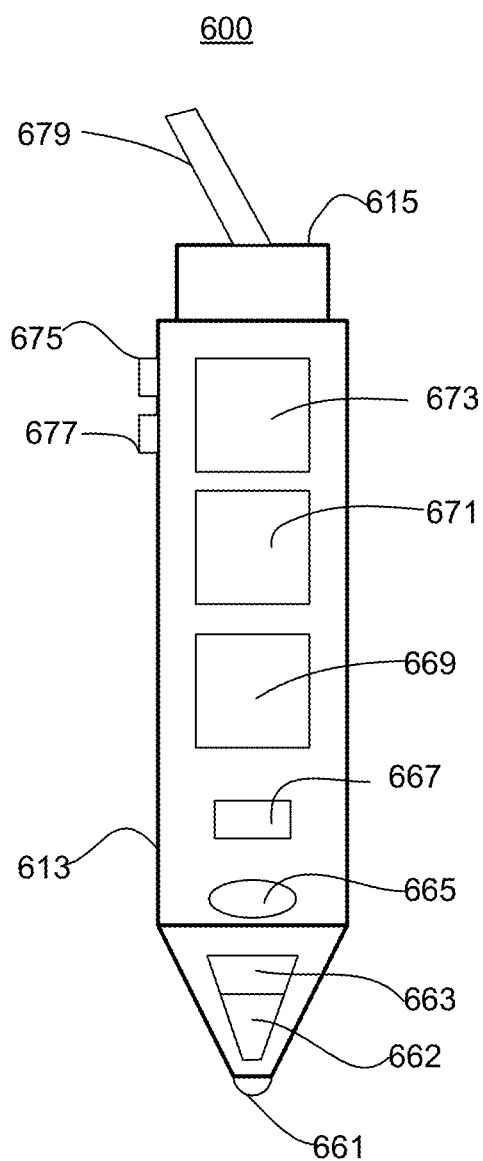
FIG. 6 depicts a stylus, in accordance with some example embodiments.

FIG. 6 depicts an example of a light-emitting pointer 600 such as stylus 120. The description of FIG. 6 includes features from FIGS. 1-5. Light-emitting pointer 600 includes body 613, buttons 615, 675, and 677, tip 661, enhancement material 662 force sensor 663, optics 665, light source 667, light source driver circuit 669, wireless communications interface 671, and battery 673 which are arranged in a specific configuration as shown but other arrangements are possible.

In the illustrated example, body 613 includes a housing for the stylus 600. Body 613 may be made from plastic, metal, composite material, or other suitable materials. Buttons 615, 675, and 677 may control features of the stylus 600 or provide an input to a computing device such as computer 110. For example, button 675 may cause light source 667 to produce more or less light. Other examples may include button 677 providing an input to a computer, and/or button 615 causing a wireless connection or pairing between stylus 600 and a computer such as computer 110. Light from light source 667 can be emitted from tip 661 that is detected by optical angle sensor 410. Force sensor 663 may detect when the pen is pressed onto a surface or is held in the hand of a user. Force sensor 663 may case stylus 600 to turn-on battery power to stylus 600. When the stylus 600 is not being pressed onto a surface or held by a user, force sensor 661 may cause stylus 600 to power down which may increase the operational life of battery 673. Optics 665 can include lenses, apertures, or other optical components.

Driver circuit 669 can provide power to light source 667. In some example embodiments, driver circuit 669 may modulate light source 667 according to a pseudo-random number (PN) code. Driver circuit 669 may modulate an intensity and/or phase of a carrier on light source 667. For example, driver circuit 669 may modulate light source 667 according to a PN code using on-off keying at a rate of 10 MHz. In another example, driver circuit 669 may modulate light source 667 according to a 100 MHz carrier that is phase modulated at 10 MHz according to a PN code.

Stylus 600 may include wireless communications interface 671 to communicate with a computer such as computer 110. Wireless communications interface 671 may operate in accordance with a wireless standard such as Bluetooth, WiFi, HSPA, and so on. The wireless may enable status the exchange of status and control information to/from stylus 600.

Enhancement material 662 can enhance the coupling of light from the stylus to a screen cover layer. For example, a clear liquid can be used as enhancement material to assist in forming a physical interface between the tip 661 of the stylus and the screen cover layer. In some example embodiments, the light from the stylus may be coupled into the screen cover layer of a curved screen with low loss of the light from the stylus.

Figure 7A:
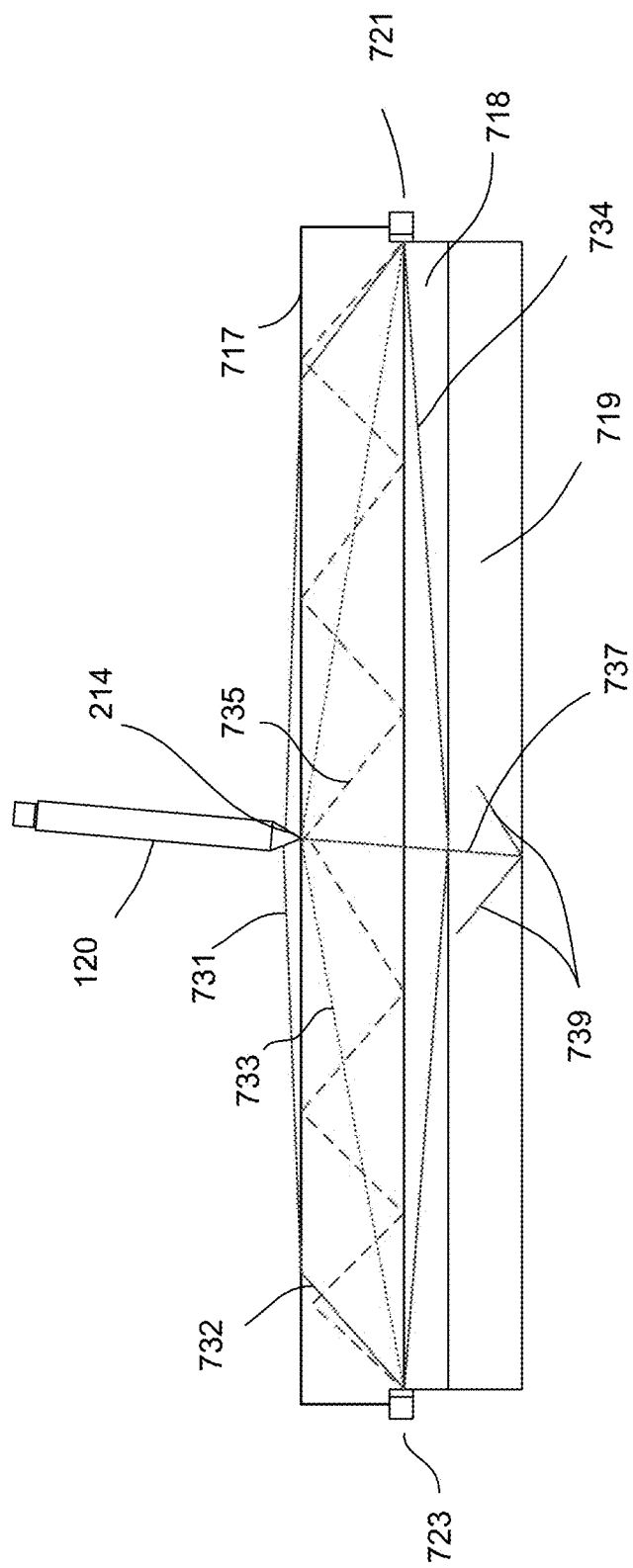
FIG. 7A depicts a cross-section view of a display with stylus in close proximity, in accordance with some example embodiments.

FIG. 7A depicts a cross-section view of a display 711 with optical angle sensors 721 and 723 and a stylus 120 in close proximity. The description of FIG. 7A includes features from FIGS. 1-6. Display 711 can be a suitable display such as the displays described above. In some example embodiments, display cover layer 717 is attached to display body layer 719 via adhesive layer 718.

Stylus 120 emits light at pointer/stylus position 214. At least some of the light emitted at pointer/stylus position 214 can be detected by optical angle sensors such as optical angle sensors 721 and 723 in FIG. 7A. The light detected by optical angle sensors 721 and 723 can include several portions. A first portion includes light 731 above the display layer 717 that can be refracted by display layer 717 to be incident on an optical angle sensor. A second portion of light can include light 733 that passes through display layer 717 directly to optical angle sensors 721 and 723. A third portion of light can include light 735 that is reflected via total internal reflection to be guided within display layer 717 and propagates to optical angle sensors 721 and 723. Some of the light from stylus 120 including light 737 passes through display layer 717, adhesive layer 718, and display body layer 719 and is scattered as a fourth portion of light 739. Fourth portion of light 729 is scattered in display layer 717 and propagates to optical angle sensor 721 and 723. The position of pointer position 214 may be determined using angles from optical angle sensors 721 and 723 and/or other optical angle sensors as described above in FIGS. 1-6. The various portions of light disclosed above (one through four) may arrive at an angle sensor such as angle sensor 721 at different elevation angles where the elevation angle lies in the plane of FIG. 7A, but the various portions of light may arrive at the same, or nearly the same, azimuth angle where the azimuth angle lies in the plane of the layers 717/718/719. The azimuth angle is the angle measured by an angle sensor such as angle sensor 721.

Figure 7B:
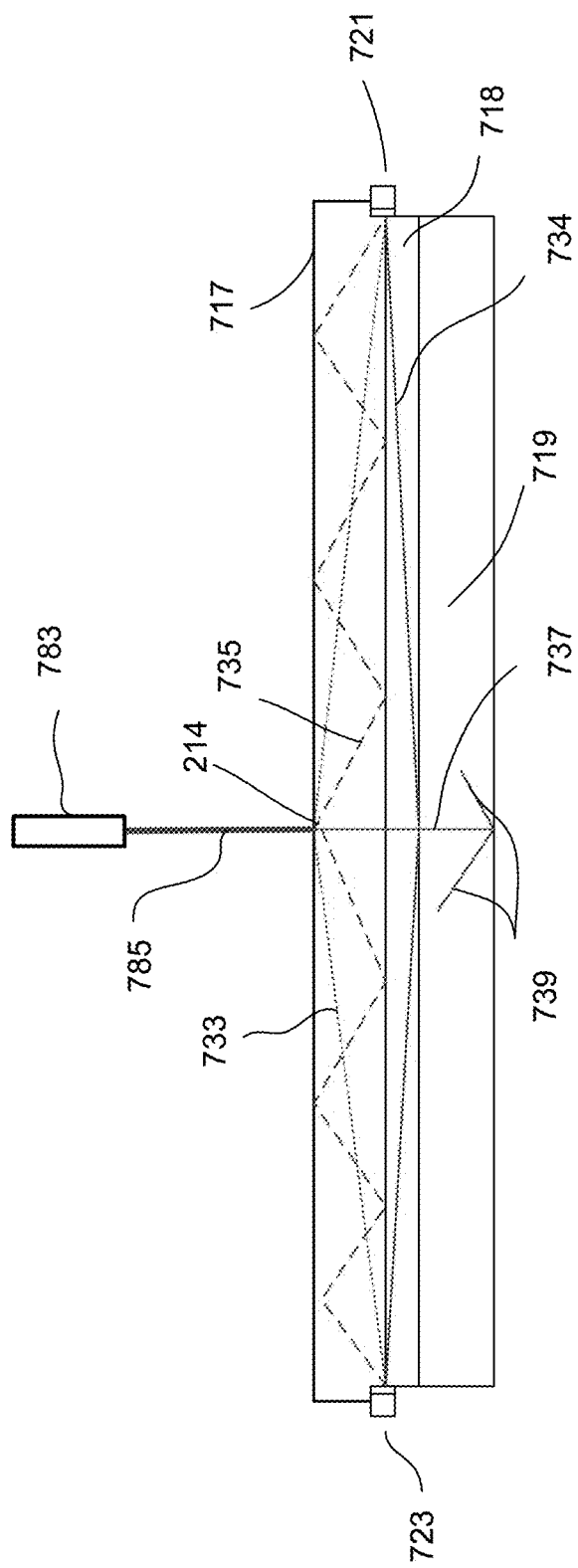
FIG. 7B depicts a cross-section view of a display and an optical pointer, in accordance with some example embodiments.

FIG. 7B depicts a cross-section view of a display 711 with optical angle sensors 721 and 723 and a pointer 783. The description of FIG. 7B includes features from FIGS. 1-6, and 7A. FIG. 7B is similar to FIG. 7A with the stylus 120 replaced by optical pointer 783. Optical pointer 783 may include a suitable optical source to emit probe light for optical sesing, such as examples of light sources described above. For example, optical pointer 783 may be or include a laser such as a diode laser emitting laser beam 785. Optical pointer 783 may be used at a distance from display 711, e.g., between 0.5 inches to 250 inches in some circumstances. Optical pointer 783 can produce a spot beam at pointer position 214 on the surface of the screen. Direct, refracted, and scattered portions of light from the pointer position 214 are detected by optical angle sensors 721 and 723. The position of pointer position 214 may be determined based on measured angles from optical angle sensors 721 and 723 and/or other optical angle sensors as described above in FIGS. 1-6.

Figure 7C:
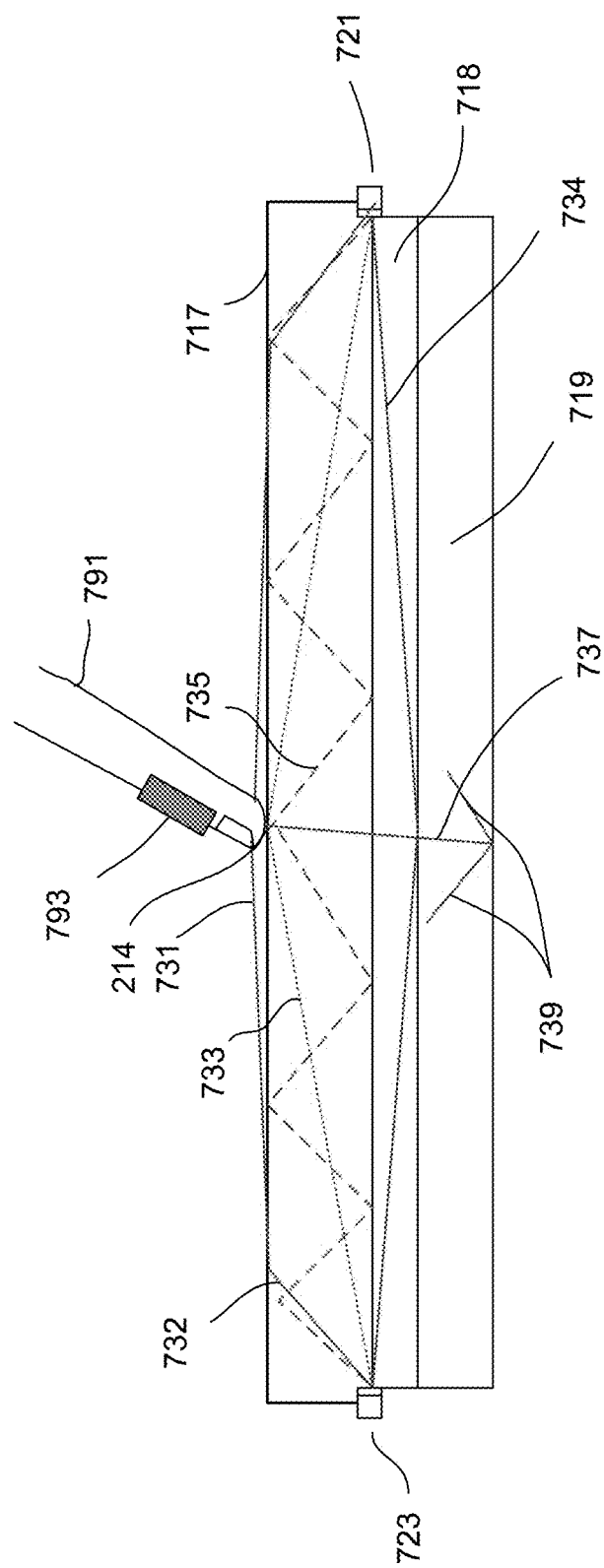
FIG. 7C depicts a cross-section view of a display and a finger used as a stylus, in accordance with some example embodiments.

FIG. 7C depicts a cross-section view of a display with optical angle sensors 721 and 723 and a user's finger with a light source 793 used as a pointer/stylus. The description of FIG. 7B includes features from FIGS. 1-6, 7A, and 7B. FIG. 7C depicts a cross-section view of a display 711 and a finger 791 with light source 793 attached. FIG. 7C is similar to FIGS. 7A-7B with light source 793 and finger 791 replacing stylus 120 and pointer 783. Light source 793 may include a suitable optical source. Light from light source 793 can be scattered by blood, tissue, and bone in finger 791. Some of the scattered light is emitted at 214 and passed to optical angle sensors 721 and 723. Optical source 793 may be within a distance (e.g., 0.1-0.5 inches) from finger 791 or may be in contact with finger 791. Light source 793 may be a laser that propagates light into finger 791 that is scattered by the blood, tissue, and bone in finger 791. Some of the scattered light may be emitted at 214 and detected by optical angle sensors 721 and 723. Direct, refracted, and scattered portions of light are detected by optical angle sensors 721 and 723 as described above. The position of pointer position 214 may be determined using angles from optical angle sensors 721 and 723 and/or other optical angle sensors as described above in FIGS. 1-6.

Figure 7D:
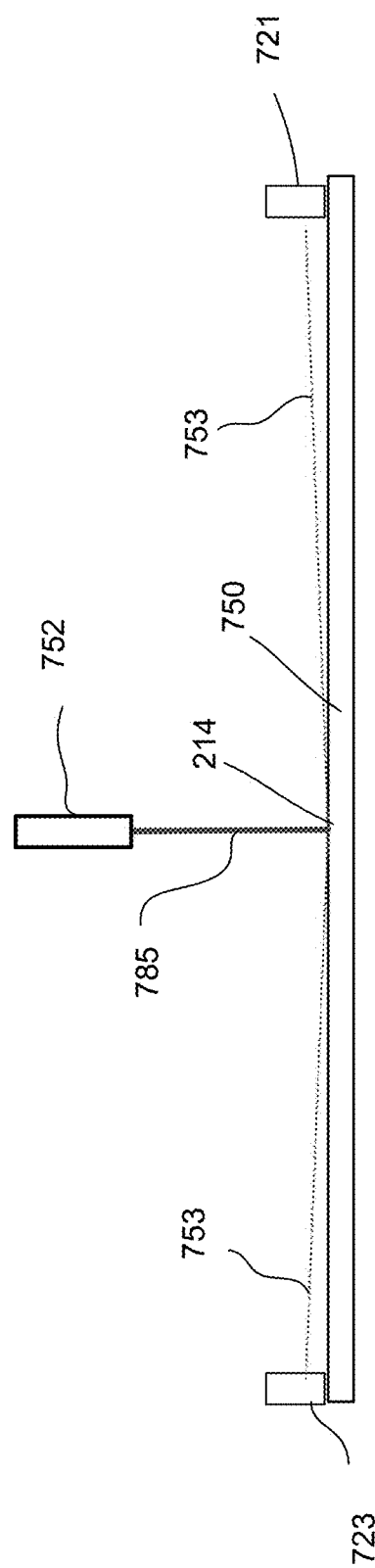
FIG. 7D depicts a cross-section view of a screen with optical angle sensors, in accordance with some example embodiments.

FIG. 7D depicts a cross-section view of a screen 750 with optical angle sensors 721 and 723 and a pointer 752. The description of FIG. 7D includes features from FIGS. 1-6, 7A, 7B, and 7C. Pointer 752 may be an optical pointer such as optical pointer 783 a distance (e.g., between 0.5 and 250 inches away) from screen 750, and/or may be a stylus such as stylus 120 between 0.1-0.5 inches or in contact with screen 750. Screen 750 includes a flexible material such as paper, cloth, plastic or another suitable flexible material. Screen 750 may include a rigid material or surface such as a wall or other rigid or fixed surface. Pointer 752 can emit light to cause an illuminated spot at pointer position 714 on screen 750. Light scattered at 753 from pointer position 214 can be detecg4ted by optical angle sensors 721 and 723. The position of spot 714 may be determined from the angles determined using optical angle sensors 721 and 723 and/or other optical angle sensors as described above.

Figure 8A:
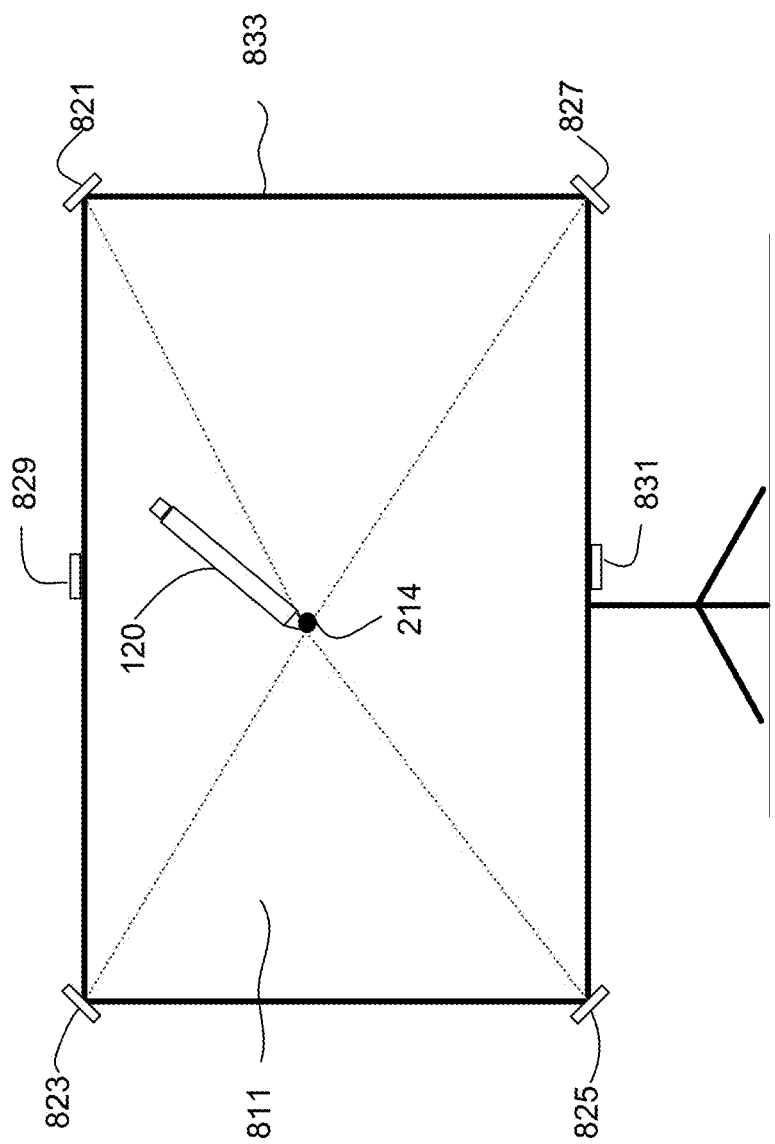
FIG. 8A depicts a screen or display with stylus and angle sensors, in accordance with some example embodiments.

FIG. 8A depicts a screen 811 with stylus 120 and angle sensors 821, 823, 825, 827, 829 and/or 831. The additional optical angle sensors 829 and 831 can be used to provide measurements of additional angles, thus improving the overall accuracy of the positioning sensing. The description of FIG. 8A includes features from FIGS. 1-6, 7A, 7B, 7C, and 7D. Screen 811 can include an electronic display as described above and/or can include a flexible screen material or a rigid/fixed surface such as a wall. For example, screen 811 can include a wall surface as the display surface with rectangular frame 833 providing a mounting for placing the optical angle sensors. In another example, the optical angle sensors may be directly attached to screen (e.g., a wall surface) 811 without frame 833. In some example embodiments, optical angle sensors may be used along the edges of 811 instead of, or in addition to, the corners of 811. For example, optical angle sensors 829 and 831 may be used to determine pointer position 214 instead of 821-827.

FIG. 8B depicts a portable computer 841 with display 843 and stylus 120. In some example embodiments, display 843 may include angle sensors such as optical angle sensors 221, 223, 225, and 227. In other example embodiments, display 844 may not include optical angle sensors 221, 223, 225, and 227 but optical angle sensors 221, 223, 225, and 227 are included external panel 847. The position of stylus 120 on external panel 847 may be determined at panel 847 or at computer 841. In some example embodiments, stylus 120 may be powered by a battery and in other embodiments stylus 120 may be powered via cable 848.

Figure 8C:
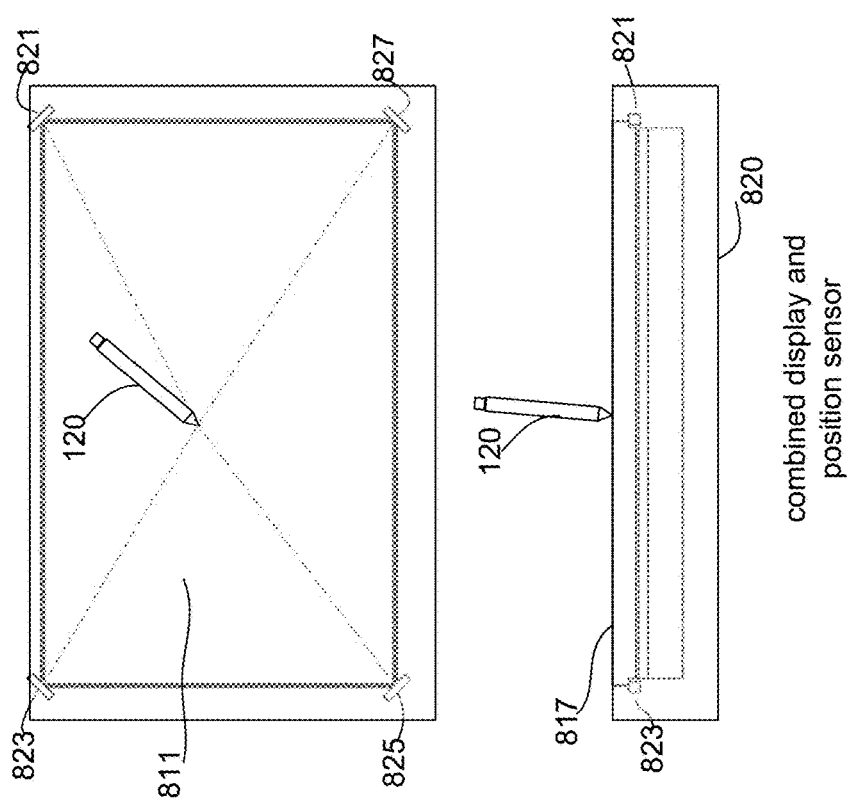
FIG. 8C depicts a display that includes optical position sensors and a display with separate optical position sensors, in accordance with some example embodiments.

FIG. 8C depicts a display 811 with stylus 120 and angle sensors 821, 823, 825, and 827. The description of FIG. 8C includes features from FIGS. 1-6, 7A, 7B, 7C, 7D, 8A, and 8B. Display 811 can include an electronic display as described above. In some example embodiments display 811 may include angle sensors 821, 823, 825, and 827 under cover layer 817 in assembly 820.

Figure 8D:
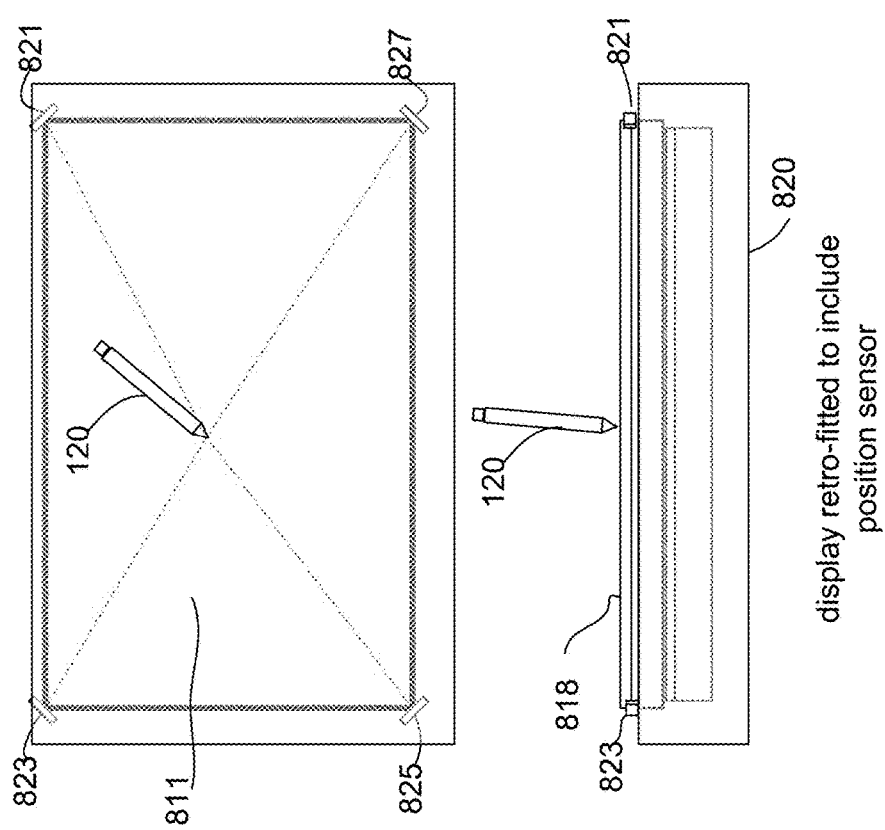
FIG. 8D shows an example based on such an implementation where an optical touch sensing module based on the disclosed optical touch sensing technology can be a retro-fit assembly that is to be added to a display that does not have a touch sensing function.

In other embodiments, assembly 820 can include display 811 with optical angle sensors 821, 823, 825, and 827 included in layer 818 that is outside assembly 820. FIG. 8D shows an example based on such an implementation where an optical touch sensing module based on the disclosed optical touch sensing technology can be a retro-fit assembly that is to be added to a display that does not have a touch sensing function. The position information based on optical sensing from the a retro-fit assembly can be fed into the controller of the display to provide touch sensing operations in connection with the display.

Figure 9:
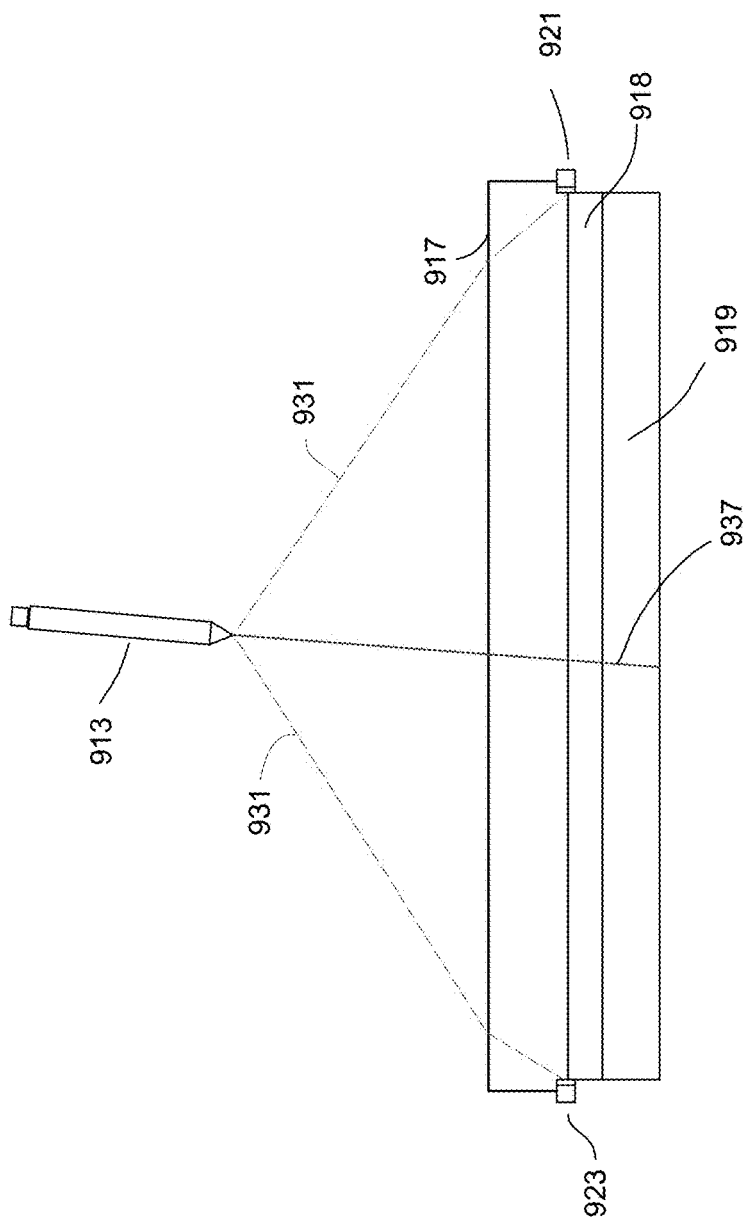
FIGS. 9 and 10 illustrate 3D optical touch sensing using a light-emitting touch pen and optical angle detectors.
Figure 10:
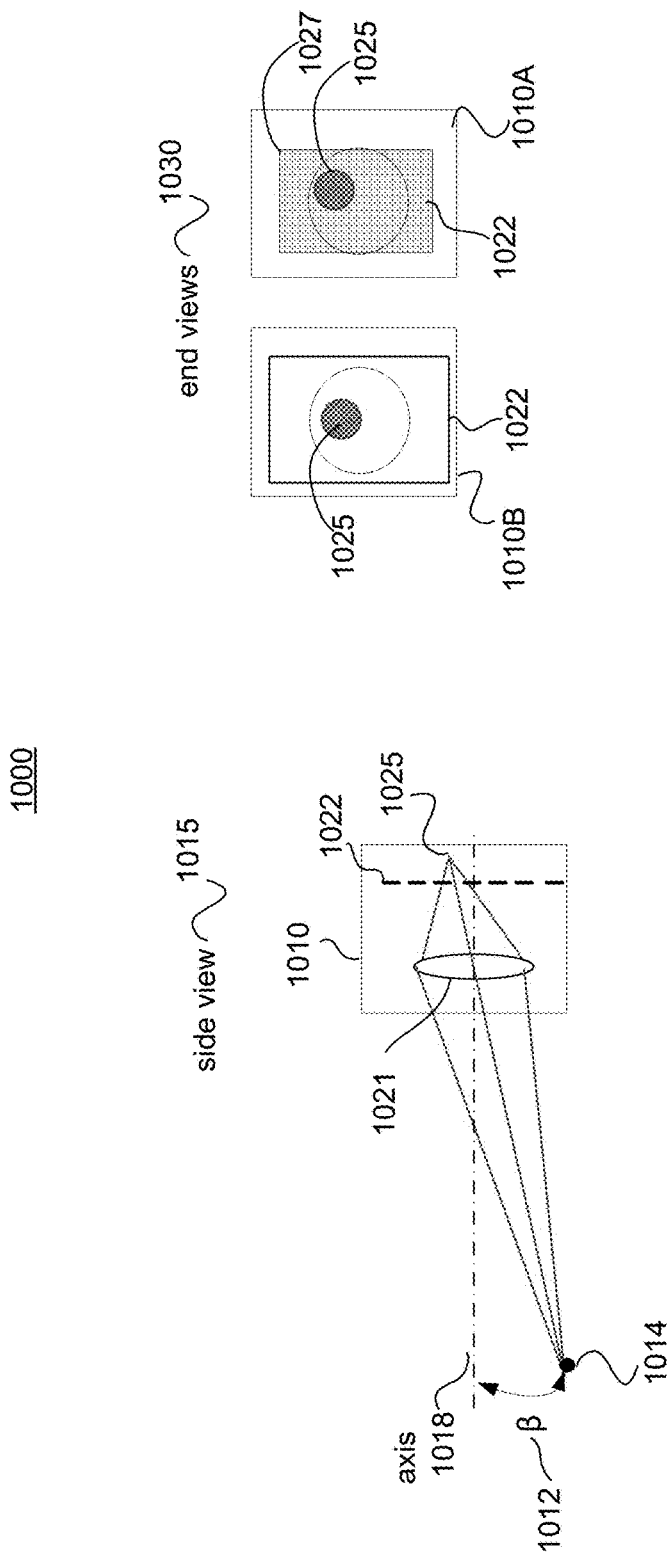

FIGS. 9 and 10 illustrate additional examples of optical touch sensing in three-dimensions (3D) by including the capability of measuring or determining the distance from the light-emitting tip of an optical touch pen or pointer from the display.

In the example in FIG. 9, a touch pen 913 projects light beams towards the touch panel formed by layers such as layers 17, 18 and 19. Some light beams 931 from the touch pen 913 are projected at large incident angles towards the display cover 917 and other light beams 937 from the touch pen 913 are projected at smaller incident angles and enter the body of the display panel. The angle detectors 921 and 923 are placed at locations on the periphery of the display panel to detect the light beam directions which include the 3D coordinates of the light source which is the pen tip of the touch pen 913. Based on the position information of the angle detectors 921 and 923, the 3D positon of the touch pen 913 can be determined, including the distance from the pen tip to the display cover layer. This optical 3D touch detection adds the distance information. The emitted light from a light source in the touch pen 913 can be modulated with a unique code so that multiple touch pens can work at same time with the same display screen. Such modulation can also be used to reduce or eliminate the undesired influence to the optical touch sensing from other light sources including the display light sources.

In implementing the 3D sensing in FIG. 9, two or more angle detectors 921 and 923 are provided at different and known locations on the screen. Each angle detector 921 or 923 includes a two-dimensional position sensitive detector (PSD) for measuring two directional angles of each received optical light beam from the pen tip of the touch pen 913 based on measurements of received light at optical detector elements along two different directions in each 2-D PSD. Since the three directional angles of a line have a relationship of $$\cos^2(\alpha)+\cos^2(\beta)+\cos^2(\gamma)=1$$

Measurements of two of the three angles allow determination of the third angle. Accordingly, each angle detector 921 or 923 with a 2D PSD allows measurements of the three directional angles of each received light beam. In this context, Therefore, such an angle detector is a 3D angle detector.

Since the locations of the two or more angle detectors (e.g., 921 and 923) are known and their relative position and distance are also known. Such information allows a processor to determine the 3-D position of the pen tip of the touch pen 913 from measurements of two or more angle detectors and in addition the pointing direction of the pen tip of the touch pen 913. Referring back to FIG. 9, the measurements from the two or more angle detectors (e.g., 921 and 923) can be used to determine, in a 3D space, the pointed location of the probe light from the touch pen 913 on the screen for touch sensing operations. This adds one additional dimension in the disclosed optical touch sensing that is missing from various 2D touch sensing techniques that only measure or determine a position within a plane such as a display surface.

FIG. 10 shows an example for implementing the 3D angle detectors 921 and 923 based on 2D array of optical detectors in FIG. 9. Each 3D angle detector in this example includes a 2D detector array 1022 to perform optical sensing on the touch pen light source. As shown on the left drawing in FIG. 10, the direction of the light source position 1014 relative to each 2D detector array 1022 can be determined from the angle 1012 (□) together with the coordinates of the receiving optics axis 1018. Each 2D detector array 1022 can also be used to determine another angle □ or □ by its optical detector elements along another direction. In some implementations, the axis 1018 for each 3D angle detector may be parallel to the surface of the display screen so that the surface for the two-dimensional array of different optical detector elements is perpendicular to the display panel. In other words, the two-dimensional position sensitive optical sensor is oriented to have a normal direction of a surface of the two-dimensional position sensitive optical sensor to be parallel to the display panel. By using multiple 3D angle detectors, the 3D coordinates of the touch pen can be detected.

This 3D positon information can be used to achieve additional functions that may not be available in other 2D touch sensing that measures a touch point position on a 2D surface such as a display screen surface. The 3D nature of the disclosed optical touch sensing shown in FIGS. 9 and 10 can be used to various applications. Examples of additional functions based on optical 3D touch detection include draw 3D shapes, to play games and other operations via the display screen.

Therefore, based on the example in FIGS. 9 and 10 a method is provided for optical touch sensing in a 3-dimensional space can be achieved by using different 3-dimensional optical angle sensors located at different peripheral positions around a display panel to detect incident angles of different light beams from a light-emitting optical pointer for optical touch sensing. The angle measurements from the different 3-dimensional optical angle sensors can be used to measure a distance of the light-emitting optical point with respect to the display panel, and, in combination with the detected incident angles of different light beams from the light-emitting optical pointer, a 3-dimensional position of the light-emitting optical pointer relative to the display panel can be determined. A touch sensing operation can then be performed via the display panel based on the 3-dimensional position of the light-emitting optical pointer relative to the display panel. Referring to FIG. 2B, a processing module can be in communication with the optical sensors to receive the measurements and to process the measurements based on the relative known positions of the optical sensors to determine the 3-D position of the optical pointer.

In applications, the 3-D position of the optical pointer can be used for various operations or functions based on the 3-D optical sensing. For example, the movement of the light-emitting optical pointer relative to the display panel can be measured and tracked based on measuring associated 3-dimensional positions of the light-emitting optical pointer to draw a 3D object via the display panel. For another example, the movement of the light-emitting optical pointer relative to the display panel and associated 3-dimensional positions of the light-emitting optical pointer in the movement can also be measured and tracked in playing a game via the display panel in a 3-D space.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for optical touch sensing, comprising:
   using different 3-dimensional optical angle sensors located at different peripheral positions around a display panel to detect incident angles of different light beams from a light-emitting optical pointer for optical touch sensing;
   using the different 3-dimensional optical angle sensors to measure a distance of the light-emitting optical point with respect to the display panel;
   combining the detected incident angles of different light beams from the light-emitting optical pointer and the measured distance of the light-emitting optical pointer with respect to the display panel to determine a 3-dimensional position of the light-emitting optical pointer relative to the display panel; and
   performing a touch sensing operation via the display panel based on the 3-dimensional position of the light-emitting optical pointer relative to the display panel.

2. The method as in claim 1, comprising:
   using a movement of the light-emitting optical pointer relative to the display panel and associated 3-dimensional positions of the light-emitting optical pointer in the movement to draw a 3D object via the display panel.

3. The method as in claim 1, comprising:
   using a movement of the light-emitting optical pointer relative to the display panel and associated 3-dimensional positions of the light-emitting optical pointer in the movement to play a game via the display panel.

4. The method as in claim 1, comprising:
   using a movement of the light-emitting optical pointer relative to the display panel and associated 3-dimensional positions of the light-emitting optical pointer in the movement as a user interface operation via the display panel.

5. An apparatus capable of touch sensing based on optical sensing, comprising:
   a display panel on which images are displayed;
   3-dimensional optical angle sensors located at different positions relative to the display panel to detect incident angles of different light beams from a light-emitting optical pointer for optical touch sensing; and
   a processor in communication with the 3-dimensional optical angle sensors to process information from the detected incident angles of the different light beams at the different 3-dimensional optical angle sensors to determine a distance of the light-emitting optical point with respect to the display panel and a 3-dimensional position of the light-emitting optical pointer relative to the display panel.

6. The apparatus as in claim 5, wherein each 3-dimensional optical angle sensor includes a two-dimensional position sensitive optical sensor.

7. The apparatus as in claim 6, wherein the two-dimensional position sensitive optical sensor includes optical detector elements at different locations.

8. The apparatus as in claim 7, wherein the two-dimensional position sensitive optical sensor is oriented to have a normal direction of a surface of the two-dimensional position sensitive optical sensor to be parallel to the display panel.

9. The apparatus as in claim 5, wherein the display screen is an electronic display that emits light to display images.

10. The apparatus as in claim 5, wherein the display screen is a screen that receives light carrying images from a projector.

11. The apparatus as in claim 5, wherein the display panel is part of a portable computer.

12. The apparatus as in claim 5, wherein the display panel is part of a portable device.

13. The apparatus as in claim 5, wherein the display panel is part of a computer system that includes anther display screen that is separate from the display panel so that a user can operate the computer system by using the display panel via optical touch sensing.

14. The apparatus as in claim 5, wherein the display panel is part of a display system in a meeting room or classroom.

15. The apparatus as in claim 5, wherein the display panel includes an LCD display.

16. The apparatus as in claim 5, wherein the display panel includes an organic light-emitting diode (OLED) display.

17. The apparatus as in claim 5, wherein the display panel includes an LED display.

18. The apparatus as in claim 5, wherein the display panel includes a projector-type.

* * * * *